May 11, 1943.  R. C. FISHER  2,318,935
ELECTROSTATIC ALTERNATOR
Filed Sept. 7, 1940  3 Sheets-Sheet 1

Inventor
Raymond C. Fisher

Inventor
Raymond C. Fisher

May 11, 1943.  R. C. FISHER  2,318,935
ELECTROSTATIC ALTERNATOR
Filed Sept. 7, 1940  3 Sheets-Sheet 3

Inventor
Raymond C. Fisher

Patented May 11, 1943

2,318,935

UNITED STATES PATENT OFFICE 2,318,935

ELECTROSTATIC ALTERNATOR

Raymond C. Fisher, Tacoma, Wash.

Application September 7, 1940, Serial No. 355,792

17 Claims. (Cl. 175—363)

This invention relates generally to the art of generating periodic voltages and currents by means of mechanically moving devices, and more specifically to the design of generating devices of the electrostatic or other type for the realization of wave forms whose harmonic contents shall accord accurately with those desired or prescribed for the devices in advance of their construction.

Generating devices of the electrostatic or other type, as well as circuits for their utilization, are already well known. However, the present invention has as one of its objects the introduction of certain improvements in construction leading to simplicity and inexpensiveness in manufacture without sacrifice in quality or dependability of performance. I have also introduced certain modifications in the design of parts of such devices, particularly those of the electrostatic type. These modifications have been found by experiment to correct the faulty performance which I have discovered in the generators built according to earlier patents in the art, particularly when used in critical applications. The devices here described are applicable to a variety of circuits. Since the circuits do not constitute a part of this invention, however, only the construction of the generator and its mechanical driving mechanism will be considered here.

Although the principles of design here enunciated are applicable to the several classes of generators above referred to, such as electrostatic, dynamoelectric, photoelectric, chopper, variable resistance, etc., it will be sufficient to explain them particularly with regard to the electrostatic alternator, and to then point out rather briefly how and to what degree they may be applied to generating devices of the other classes.

One of the objects of the present invention is to generate desired or prescribed periodic wave forms by means of electrostatic alternators of simple, inexpensive construction comprising die castings and molded plastic parts, and the design of the electrodes is such as to permit easily constructed casting and plastic molds without sacrifice of accuracy of the wave form generated.

A second object is to provide a construction for the electrodes or other instrumentalities whereby any one or more harmonics, as well as the harmonic multiples thereof, may be suppressed by suitable variations in the electrode contours.

A third object is to provide a construction for the electrodes or other instrumentalities such that the harmonic content of the generated voltage is very low.

A fourth object is to provide a construction for the electrodes or other instrumentalities whereby the generated voltage may be made to vary in accordance with a prescribed complex wave form to a high degree of accuracy, without sacrifice in the magnitude of such voltage.

A fifth object is to prevent certain deleterious effects of leakage through and over the insulation in electrostatic alternators, by means of trap electrodes, defined hereinafter.

A sixth object is to protect the electrodes of an electrostatic alternator from deleterious inductive effects arising in the mechanical transmission which actuates it.

A seventh object is to provide a pair of friction gears free from deleterious microphonic effects, and at the same time permitting variations in its speed ratio.

An eighth object is to provide a novel form of magnetic linkage in the mechanical transmission for actuating a generator, which shall reduce the microphonic effects originating in a pair of gears.

A ninth object is to provide a means for "picking up" a high frequency or otherwise varying alternating current from the rotor of an electrostatic alternator.

A tenth object is to provide a multiple frequency electrostatic alternator of unusually compact construction, which is at the same time inexpensive to construct in quantity production, and which is therefore particularly well adapted to be used in electronic musical instruments.

An eleventh object is to provide an electrostatic alternator particularly well suited to modulate supersonic electric currents.

A twelfth object is to reduce the deleterious effect of residual varying currents arising in an electrostatic alternator, as hereinafter more fully explained.

A thirteenth object is to provide a construction for an electrostatic alternator which shall be free from the microphonic effect of play in its bearings.

A fourteenth object is to provide a construction of electrostatic alternator which shall be free from the noise currents otherwise arising in the bearings of the alternator.

The invention further consists in the various combinations and sub-combinations hereinafter more fully set forth in the hereto appended claims.

In the accompanying drawings illustrating a preferred embodiment of my invention.

Figure 1:
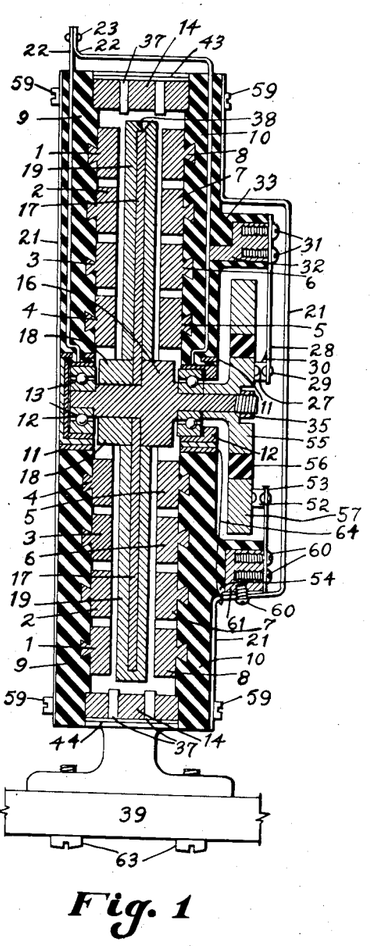
Figure 1 is a view in section along plane BB of Figure 2 of a single electrostatic alternator according to my invention, together with a part of its driving mechanism.
Figure 2:
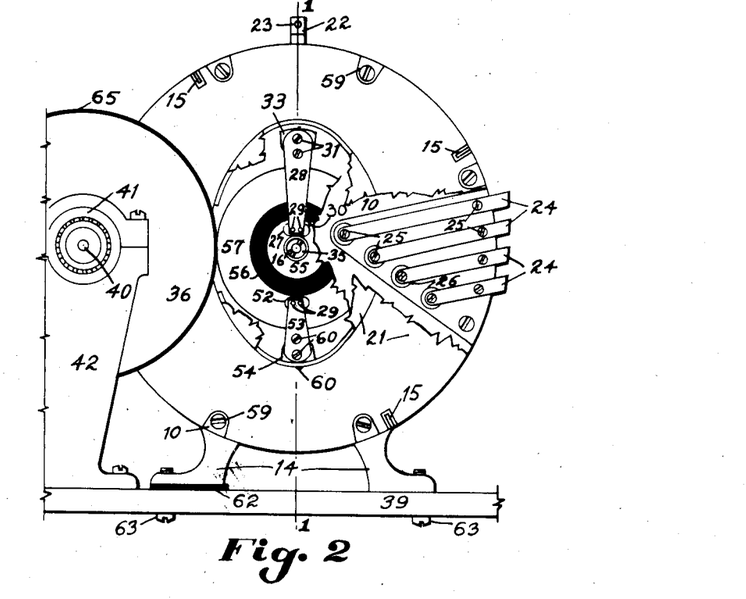
Figure 2 is a view of the same in side elevation.

The form of electrostatic alternator to be first described is shown in Figure 1 in cross section and in outside elevation in Figure 2. In Figure 1, parts 1 to 8 are eight die-cast annular stator electrodes, or tracks, having the form of coaxial rings. The inner faces of these electrodes bear raised and indented areas which I term respectively "lands" and "indentations." It will be understood that, due to these, the capacitance between the rotor and each of the stators will vary periodically as the rotor revolves. The exact shapes of the lands and indentations constitute an important part of this invention, and will be described in detail later. The outer faces of electrodes 1 to 8 have annular undercut "tongues," as shown, which lock them securely to the molded plastic end plates, 9 and 10.

A preferred method of constructing these parts is to first cast the electrodes, and to then introduce them as "inserts" into the plastic mold. The plastic will then be molded around the tongues above mentioned, consequently minimizing the likelihood of distortion in the shapes of the electrodes while the alternator is in use.

Near the center of each end plate 9 or 10 will be seen a metal ring 11, which I term a leakage trap, and, inside part 11, a metal cup 12, which I term a bearing sleeve. Parts 11 and 12 are concentric, and insulated from each other by a layer of plastic, as better shown in Figure 3. They are also placed in the plastic mold as inserts. They may be of any suitable metal, and may conveniently be diecastings. To prevent slipping in the plastic, they may be knurled, or else have several holes to which the plastic can cling. Each of the sleeves 12 is partially enclosed on its outer end, as shown, thus serving to retain in place the ball bearing 13, against the thrust of the rotating parts which it supports. The function of the traps will be explained below.

It is considered preferable originally to cast the inner diameter of the sleeves 12 slightly too small for the bearings, and to accurately machine them to fit the bearings after the molding operation. At the same time, the outer portions of end plates 9 and 10 may be faced where they fit against the housing 14, and the inner faces of parts 1 to 8 may be also accurately faced.

The housing 14 is simply a cast or diecast ring with two feet, which are better illustrated in Figure 2. Figure 1 shows also four inspection slots 37, two at the top and two at the bottom of the ring portion of the housing. The slots etxend through the housing from the inside to the outside. Two similar slots are located at each side of the ring, in 90 degree relationship to the four just mentioned. The four at the sides cannot be conveniently shown in the drawings. The purpose of the eight slots is to permit inspection of the air gaps between the electrodes after the alternator has been assembled. It may prove advisable, in case the housing is a sand casting, to machine those surfaces where the end plates bear against it, and also the inside surface of the ring.

The housing has eight fins, 15, four of which appear in Figure 2. These project from the housing in such manner as to fit accurately into corresponding slots in the end plate 10, whereby the latter is accurately centered during and after assembly, despite variations in the shrinkage of the plastic molding, which often occur. The fins may conveniently be forced into slots in the housing or else sweated into place there after the latter is machined, thus preventing their interfering with the machining operation. On the other side of the housing are four similar fins fitting into end plate 9. The end plates are both secured to the housing by means of the machine screws 59.

On the bearings is supported a rotor electrode, about to be described. The steel shaft 16 is machined roughly to form, and the steel disc 17 is sweated to it with silver solder, or other high-melting-point solder, and further secured by collar 18, also similarly sweated to parts 16 and 17. The disc may have a number of holes through it, for a purpose to be later described.

This partially completed rotor, consisting of parts 16 to 18, is then inserted in a diecasting mold, and the remainder of the rotor, namely part 19, is then cast around it. Part 19, like the stator electrodes, 1 to 8, has lands and indentations, whose form will be described later. In casting or molding, the casting metal will flow through the holes in the disc, and form an excellent bond. If desired, the disc 17 may be tinned before the casting operation, so as to hold together parts 17 and 19 intimately throughout their contiguous surfaces. Of course in this case it will be necessary to use a diecasting metal and a solder which will adhere together.

After removal from the mold, the entire rotor is machined to final dimensions, particular care being taken to make the disc turn true. The rotor is then set into static balance by drilling out one or more holes 38, as shown in section at the top of the rotor in Figure 1. Methods for the accomplishment of this are well known, and not a part of this invention. The result of the above operations is a rotor of great permanency, rigidity, and accuracy, suitable for quantity production.

A ball bearing 13 is pressed onto each end of the rotor shaft. Referring to the large scale detail view of Figure 3, between the outer races of the ball bearings and the bearing sleeves 12 are placed as many washer-like shims 20 as needed to properly adjust the air gaps and to prevent end play in the shaft. I have found by experiment that it is quite necessary to slightly preload the bearings, permitting the slightly yielding plastic end plates 9 and 10 and the shims 20 to maintain a constant slight pressure toward each other of the two outer bearing races. An attempt to operate such a condenser without actual preloading resulted in an intolerable amount of microphonic vibration in the parts, which rendered the device unsuitable for exacting applications in the musical and other fields. Slightly yielding shims made of chemist's filter paper were found entirely suitable.

Another advantage of preloading the bearings is that it renders possible the making of electrical connection to the rotor through the bearings, thus dispensing with the necessity for a contact brush, at least under certain conditions. Efforts to make connections through bearings which were not preloaded resulted in every instance in noise in the electric circuit which was clearly traced to variations in contact resistance between the bearing races and the balls. Preloading brought the unexpected result of clearing up contact noise, as well as that mentioned in the paragraph above.

Cemented or otherwise secured to the outer faces of the end plates are metallic shields 21, which are simply thin sheets of copper, brass, or other metal grounded by suitable wires which are not a part of the alternator. Around the parts 15 and 59, the shields have cut out portions, as shown in Figure 2, so that they need not necessarily make contact with those parts in case the housing is not to be grounded. The shield at the left has a boss, and that at the right has a hole, so that they do not make contact with the bearing sleeves. The leakage traps, at their outer ends, where they project through the end plates, are connected electrically to the shields in any suitable manner, so that the traps may also be readily grounded. That at the left, Figure 1, is conveniently sweated directly to the shield after assembly, while that at the right is connected to the shield by means of a wire 64.

Figure 3:
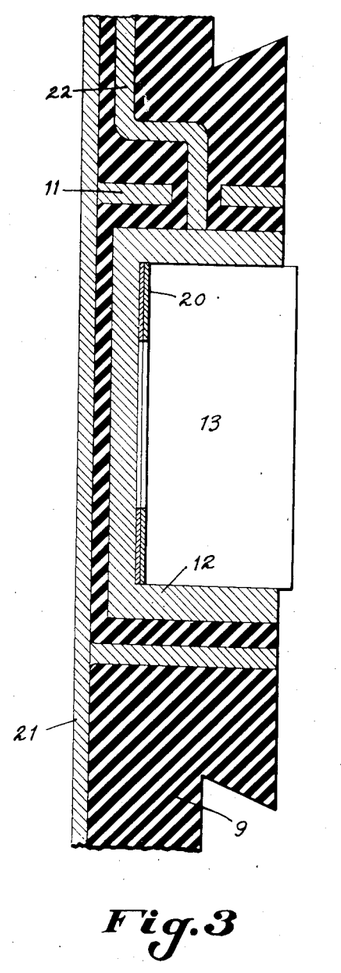
Figure 3 is a detail view of those parts of the alternator adjacent to the left-hand bearing.

In cases where it is desired to make electrical connection to the rotor via the bearings, two strips of metal 22, one on each side of the alternator, are molded into the plastic. At the inner end of each, and as best shown in Figure 3, they are hard soldered to the bearing sleeves 12. In order that the strips may have access to the sleeves without coming into electrical contact with parts 11 where they pass through the same, those parts are provided with substantial holes, as best shown in Figure 3. In molding, the plastic powder would flow and mold solidly into the holes in parts 11, as illustrated. The several parts can be accurately held in position in the molding operation, thus preventing the possibility of subsequent short-circuiting. The strips are extended to the top of the assembly for use as terminals, and may be attached together after assembly by a rivet 23.

To provide electrical connection to each of the eight stator electrodes, eight metal terminal strips 24, four of which appear in Figure 2, are attached to their respective electrodes at one end, and to the plastic case near the other by screws 25. A recessed portion may be left in the plastic end plate, as shown, to accommodate these terminals. To facilitate attaching and electrically connecting the strips to the electrodes, a small projecting portion, or "lug" 26 may be provided on each electrode, projecting outward to the face of the plastic, so that the screws may have sufficient length of thread in the diecast metal. It would also be feasible to mold parts 24 as inserts in the plastic end plates. In Figure 2, shield 21 is shown partially cut away to expose parts 24 to 35 to view. It is to be understood, however, that it may cover these parts for the purpose of shielding, as I show in Figure 1. The left-hand shield in Figure 1 is flat, but the right-hand one has a boss, accommodating parts 24 to 35.

In certain instances, and particularly for low-impedance use, such as when the alternator is excited from a radio-frequency source, it may be inadvisable to depend upon ball bearings for electrical contact with the rotor. In such case, self-lubricating bronze or bronze-and-graphite bearings might be substituted, provided proper attention in their design is given to supporting the thrust forces resultant from preloading. In low-impedance use, I have found it more satisfactory, however, to provide a separate contact brush which consists of a small piece of carbon or graphite 27, round or oval in cross-section, and connected electrically by a pigtail 30 to a brush holder 28, which last is in the form of a flat bronze leaf spring. The graphite is mechanically supported from the spring by means of a pair of pins 29 which are soldered to the spring and which project part way through the brush. They fit rather loosely into holes in the graphite. In my experience, non-rigid attachment appears to discourage a tendency to brush vibration.

The brush holder is electrically connected to one of the strips 22, through one of the two screws 31, and the brass insert 32, the latter being riveted to the strip inside the plastic, as shown in Figure 2. A boss 33 is provided on the end plate 10 to support the brush holder 28 and to contain the insert.

The brush bears against the metal hub of the driven friction gear 34, and through it maintains electrical connection with the rotor. Preferably, the ends of the brush are made slightly concave, as illustrated, so that the brush touches the hub and the brush holder only at the outer margins of its ends. This helps to prevent any rocking of the brush, which may result in brush vibration.

For a reason about to be explained, in certain cases, particularly in circuits where the rotor is connected to the grid of a vacuum tube in an audio-frequency amplifier, I have found it very desirable to employ, besides the brush for connection to the rotor, also the additional connecting members 22, which electrically tie the outer bearing races or stationary bearing members to the rotor by a path external to the rotor, namely via the sleeves 12, the brush holder 28, brush 27, and the hub 55. There is sometimes a tendency for an electrically "floating" outer stationary bearing member to acquire a potential different from the rotor, perhaps by friction, and to discharge to the rotor shaft from time to time through the balls, as they provide a temporary connection to the shaft. This results in noise currents in the amplifier. By means of members 22, the stationary portion is held at all times at substantially rotor potential or at some other potential fixed relative thereto, and noise is thus obviated. As has been indicated, however, the electric circuit connected to the alternator determines the precise construction. In some circuits, both brush and external bearing connection are necessary; in other only the one or the other; in still others, as will later appear, neither is needed.

Relative motion between stator and rotor electrodes is maintained by means of friction gears. The driven gear is attached to the shaft 16 by means of a nut 35. As will be later explained, this gear is composed partly of metal and partly of molded plastic, the hub being a metallic insert therein. At the periphery is a smooth metal tire, and the drive is entirely by friction from the driving gear 36, Figure 2.

This driving gear has a soft rubber tire 65, as shown, which is sufficiently compressible and yielding to permit appreciable area of contact between the two gear peripheries. In experiments with gears of this kind, I have discovered that the driven gear may run some 3.5% faster than one would calculate from the ratio of the radii of the two contact circles, at least when the rubber-tired gear has a greater diameter than its mate. This fact at first appears somewhat paradoxical, but can be understood by carefully considering the path traveled by a point on the surface of the tire. Thus a choice of gear diameters is best arrived at partly experimentally.

The speed of the driven rotor must naturally be very accurately maintained in a musical instrument, and in any other use where the frequency of the generated voltage is to be held within close limits. To this end, one foot of the alternator housing 14 is made somewhat shorter than the other, and is supported on a thin block of soft rubber 62. By tightening machine screw 63, the left-hand side of the housing in Figure 2 may be drawn closer to the chassis 39, and consequently the center-to-center distance between driving and driven gears will be lessened. This will effect a slight adjustment of the speed and frequency. It will be noted that the larger of the two gears is the one provided with the tire. This provision was made in the interest of accuracy of speed ratio, should a slight change in center-to-center distance occur for any reason, such as a change in temperature. In practice, a drive of this kind has been found to be quite silent, and unusually free from vibration, such as might cause microphonically produced voltages in the alternator output.

The driving gear is rotated by a countershaft 40, journaled in a ball bearing 41 and other similar ones at positions spaced apart along its length. A single countershaft may in this way drive several alternators, each at a different speed. The bearing is supported by a bearing hanger 42. In the manner of other electrostatic alternators, the countershaft may be rotated at an appropriate speed by means of a synchronous motor or other electric motor which, being well known, is not shown. Since the arrangement of these parts is well known, they will not be described in greater detail.

The shield 21 has a hole in its side, as seen in Figure 2, to permit contact between the gears.

Upon first setting up and operating a friction gear on an electrostatic alternator, I was quite surprised to find in the electrical output thereof a very considerable noise component of E. M. F. This was traced to frictional voltages built up on the friction gears as then designed. To remedy this disturbance, I contemplate, according to the present invention, a driven gear which has a metallic tire, or rim 57, as shown. In other words, inspecting the gear from center to periphery, we find, first, a metallic hub 55, then a ring of plastic 56, then a rim of metal 57. Against the rim I provide a collector brush 52, and brush holder 53, which are the counterparts of parts 27, 28 above described. By means of mounting screws 60 this brush is supported and connected to the shield 21, which is customarily grounded. The brush assembly is supported on a plastic insulating boss or post 54, which is integral with the end plate and which is provided with a metal insert 61. The above-described grounding brush and gear construction serve to prevent the accumulation of any great amount of electrostatic charge on the driven gear, since as fast as a slight charge develops, it is promptly conducted to ground. Moreover, the tire is insulated from the hub by the plastic ring above mentioned.

We return now to a consideration of the alternator proper. Electrically, besides the eight stator electrodes, the alternator consists of two mutually insulated groups of elements; (a) the rotor, bearings, and brush assembly 27, 28 which are connected together, and (b) the shields, driven gear rim, brush assembly 53, 52, and, in certain circuits, the housing. The group under (b) is commonly grounded. In certain circuits, the assemblage (a) may also be grounded, whereas in others it may be connected to the grid of a vacuum tube. In the latter case, when either of the innermost stator electrodes, 4 or 5, is connected to a source of polarizing potential, the leakage over the insulation between these electrodes and the rotor may be found to be troublesome in certain cases, without the interposition of the leakage traps, since the rotor may receive a charge by leakage which causes the tones of all eight stator tracks to sound to a slight extent, instead of only that of the track chosen, as intended. It is to be noted that the leakage traps are inserted in these leakage paths between active electrodes; namely, between the rotor and the innermost stator electrodes. The traps being ordinarily connected to ground, any leakage currents which might otherwise flow from stators to rotor or vice versa over or through plastic parts 9 and 10 will be conducted to ground. Accordingly, these stators can influence the rotor only electrostatically, and not by spurious conductive paths. Likewise, if the rotor is connected to a source of polarizing potential, and the stator tracks are selectively connected to the grid of a vacuum tube, as in Patent No. 2,187,910, the trap will also prevent leakage between them.

It is to be noted that the trap electrode is used for a different purpose from that of the guard electrode of my Patent No. 2,055,719. The trap electrode is to trap currents conducted by an insulating member, whereas the guard electrode is to modify the electrostatic field in the neighborhood of other electrodes.

For the sake of appearance, and to effectively close the inspection slots 37 against the entrance of dust, a strip of brass 43, lined with soft leather, is screwed or otherwise secured around the top and sides of the periphery of the housing, and a separate piece 44 covers the bottom slots, between the feet of the housing. Each appears in cross-section in Figure 1. Or, otherwise, the slots may be sealed with adhesive tape.

In certain musical applications of alternators of the type or types herein described, it may be desired to maintain the several variable capacitances in electrical connection with an amplifier at all times, and to "play" the tones from them by imposing a direct polarizing potential on the electrodes, and to silence them by removing said potential. When they are to remain silent, it is essential that virtually no polarization reside upon the electrodes, even by accident. To this end, the circuit must naturally be such that polarization is not applied from the external circuit. Besides this, however, care must be exercised to prevent the accumulation or existence of potential differences between the electrodes, or between portions of the same electrode, from sources within the alternator. I have found by experience that metallic surfaces, such as those of the electrodes, are prone to have potentials resident on them, and I ascribe these to contact potential phenomena. At any rate, whether my theory is correct or not, I have found that some tone, which I term "residual tone," may frequently be generated upon rotation of the alternator, particularly if the electrode surfaces are not perfectly bright and clean. Nor is it likely that they will remain so for more than a few minutes or at most a few hours, unless the electrode surface is of a non-oxidizable, non-tarnishing nature. For example, I have found that even an alternator with silver-plated electrode surfaces became intolerably noisy within about forty-eight hours.

However, experience has shown that an alternator may be rendered virtually silent (except when polarized from without), by electroplating the electrodes with some non-tarnishing metal such as gold, or by coating them with graphite. The adjacent surfaces of both the rotor and the several stators must be identically treated. As a satisfactory method of applying the graphite, I suggest first thinly and smoothly varnishing the electrodes, both rotor and stators, and then, while the varnish is still "tacky," brushing finely divided graphite over the varnish, so as to coat it completely. No lacquer or other finish on top of the plating or the graphite is advisable, since it appears to collect charges on its surface. In other words, the effective surface is apparently no longer the metal or graphite, but the varnish, when the latter is applied on top. Although I have used the above method of graphiting in an experimental device, and found it entirely successful, yet it would probably be more feasible in commercial production to spray the surface with "aquadag," following the method recommended by the manufacturers of that product.

The above explanation regarding residual tones applies particularly to alternators utilizing direct E. M. F. for the polarization of its tracks. As pointed out in my Patent No. 2,055,719, it is also feasible to use supersonic E. M. F. for this purpose, and in such case the danger of trouble from residual polarization, if it exists at all, has no relationship to surface treatment of the electrodes. In utilizing my alternator with supersonic polarization, connection to the rotor parts 16 to 19 need not be made conductively via the brush 27, but may be made inductively, via the housing 14, and the capacitance between said housing and rotor, particularly residing in the air gap around the rotor periphery, and inside the housing. Any circuit element connected to the housing is then connected to the rotor indirectly, through said capacitance, and the housing serves as a pickup electrode. In order that this capacitance shall not introduce into the circuit unwanted variations of impedance as the rotor revolves, it is essential that the capacitance remain substantially constant throughout a revolution. To this end, the inside surface of the housing and the peripheral surface are cylindrical and coaxial (except for the minor effect of inspection slots and balancing holes), as Figures 1 and 2 illustrate. If any variation in capacitance from the holes is anticipated, they might be plugged with a light-weight conductor, such as carbon or graphite. The inspection slits may be plugged with metal, after alignment of the rotor is complete. Of course, the capacitance mentioned must be large enough in comparison with the capacitances between rotor and stators so that the circuit is quasilinear, according to the teaching of my Patent No. 2,055,719. According to the circuit in which the alternator is to be used, its parts may have to be proportioned differently in order to attain quasi-linearity, as will be understood. Thus, the precise proportions illustrated in the accompanying figures may not be best for all cases, and I intend to comprehend all suitable proportions within the scope of this application.

We come now to a consideration of the exact contours of the electrode surfaces for the attainment of sinusoidal or other wave forms. As is well understood, the electrostatic alternator produces periodic voltages by virtue of periodic variations in capacitance between its parts; in the present instance, between the rotor electrode and each of the eight stator electrodes. It is seen, therefore, that the contours of the adjacent surfaces of the rotor and stators must be such that the desired fluctuations in capacitance actually occur during relative rotation. These fluctuations are, of course, due to the variations in effective area; i. e., in the area of each electrode which is electrostatically effective upon the other. As has already been stated, each of the stator electrodes has alternate lands and indentations, and the rotor likewise bears lands and indentations arranged in coaxial rings. Each rotor ring coacts with one of the stator electrodes to cause a periodic fluctuation in capacitance between the rotor and that stator. Thus it may be said that the alternator comprises eight variable condensers.

Referring to Figures 1, and 4 to 7 inclusive, the stator electrode 1 and its coacting rotor track 101 each have one land and one indentation; stator electrode 2 and its partner 102 on the rotor each have two lands and two indentations; pairs 3 to 8 have respectively 4, 8, 16, 32, 64 and 128 lands and indentations. Parts 5 to 8 do not appear in Figures 4 to 7. It is considered unnecessary to show them in detail, and the showing of Figure 1 is believed to be adequate. A complete understanding of their shapes will be gleaned from the illustration of tracks 1 to 4, in combination with the accompanying description.

It will be evident that the eight condensers generate respectively 1, 2, 4, 8, 16, 32, 64, and 128 cycles of alternating voltage and current per revolution of the rotor. Hence, if $s$ is the number of revolutions of the rotor per second, the pairs of tracks will respectively generate the frequencies $s$, $2s$, $4s$, $8s$, $16s$, $32s$, $64s$, and $128s$; i. e., eight frequencies at octave intervals.

As will be evident from a study of the art, twelve of such alternators, if driven from a common countershaft 40, each through a pair of gears of appropriate diameters, will generate all the pitches of tone, by half-tone steps, throughout a gamut of eight octaves; i. e., 96 different pitches or frequencies. This illustrates one of the uses to which the present alternator may be put.

No novelty is here claimed for an electrostatic alternator adapted to generate 96 different pitches. The chief novelty in my invention, however, consists in the forms of the indentations and lands which render it capable of sinusoidal wave forms of capacitance variation with a minimum of difficulty in construction, and more particularly it consists in the dimensions of lands and indentations in what I have chosen to call the longitudinal direction, i. e., in the direction of the relative motion between rotor and stator.

Figure 4:
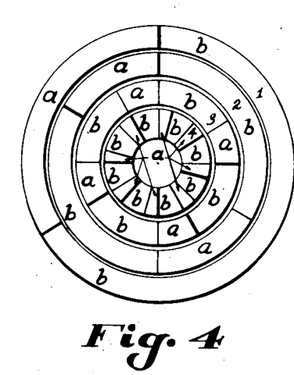
Figure 4 is a detail of four of the stator tracks.
Figure 5:
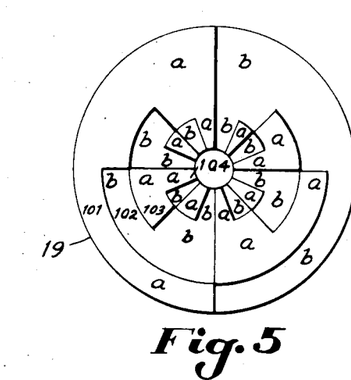
Figure 5 is a detail of four rotor tracks.

In Figure 4, I show such lands and indentations on stator electrodes 1, 2, 3, and 4. Indentations are designated "b" while lands are designated "a." Each land is outlined by concentric arcs and radii, as illustrated. All the lands of a given track are machined carefully to a plane surface which, after assembly of the alternator, is normal to the axis of rotation of the rotor. The rotor track which cooperates with a given stator electrode appears on the rotor directly opposite that stator. It has the same number of lands and indentations as its corresponding stator electrode. As illustrated in Figure 5, the rotor lands are likewise bounded by concentric arcs and radii. Rotor tracks 101 to 104 coact with stator tracks 1 to 4 respectively. The rotor lands, like those of the stators, are machined to a plane surface normal to the axis of rotation. Thus, after assembly, the air gap between the lands of any rotor track and those of its coacting stator electrode remains constant during rotation of the latter. This air gap may be 0.010 to 0.020 inch if the alternator is accurately made. The surfaces of the indentations in any given rotor or stator track lie in a plane, like those of the lands. However, they are so remote from the coacting electrode that they are practically inert electrically, and need not be machined. Since the appearance of the rotor lands of tracks 105 to 108 can be understood from the illustration of tracks 101 to 104, in combination with the accompanying description, tracks 105 to 108 are not illustrated.

As taught in my Patent No. 2,055,719, it is preferable to so proportion the tracks that one of the two coacting tracks of each condenser "overhangs" the other in a direction at right angles to that of relative motion, in order that fringing, in combination with any slight eccentricity or eccentricities in the tracks, may not interfere seriously with the law of variation of the interelectrode capacitance. This expedient makes it possible to impose considerably less stringent demands on the accuracy of construction without sacrifice of purity of tone. To this end, I show the outer diameter of the outside rotor track as slightly greater than that of the outside stator track, and the inside diameter of said rotor track as slightly smaller than the inside diameter of said stator track; in other words, the rotor track overhangs the stator track, both at the outside and the inside, in the radial direction, at right angles to the direction of the relative motion of the two tracks. A similar remark applies to the other seven pairs of tracks.

The above constructional features of the tracks and electrodes are considered necessary, but not sufficient for the realization of sinusoidal wave forms. In addition, the arcs subtended by the lands and indentations (i. e., their dimensions in the circumferential or longitudinal direction), must also be chosen advisedly.

In the discussion following, the terms, "wave form," "harmonic," "harmonic content," and "partial" are used in the senses well known to those skilled in the Physics of Sound, but also with reference, not only to sound, but also to a capacitance, voltage, current, or other recurrent quantity or phenomenon. However, I use the word, "wave length," where applied to a rotary type of alternator, in a somewhat unique sense. In this connection, it means that angle through which the rotor must rotate to generate one cycle. Thus, relative to tracks 1 and 101, having one indentation and one land on the stator and the same on the rotor, the wave length is 360 mechanical degrees; relative to tracks 2 to 8 (and 102 to 108), it is respectively 180, 90, 45, 22.5, 11.25, 5.625, and 2.8125 mechanical degrees. I designate the wave length hereinafter by the symbol, $L$.

To suppress a given harmonic, say the $n$th, according to one method which I have discovered, one imparts to the lands of one of the tracks, either the stator or coacting rotor track, a dimension, in the direction of its motion relative to the other electrode, equal to an integral number of $n$ths of a fundamental wave length. To illustrate, for the attainment of a good approximation to sinusoidal capacitance variation in each of the eighth condensers, one must and can suppress at least the second and third harmonics. Accordingly, I assign to each stator land an angular, or longitudinal dimension, along the arc of rotation, of $L/3$, and to each rotor land I assign a longitudinal dimension of $L/2$. The lengths of the stator and rotor indentations are then respectively $2L/3$ and $L/2$. The dimensions assigned in this case to the stator elements are responsible for the suppression of the third harmonic in the capacitance, and also of all harmonic multiples thereof, as the sixth, ninth, twelfth, etc. Those assigned to the rotor elements are responsible for the suppression of the second harmonic, as well as all other even harmonics. Thus, for example, for tracks numbers 4 and 104, where $L$ is 45 degrees of arc, the stator land subtends 15 degrees, the stator indentation 30 degrees, the rotor land 22.5 degrees, and the rotor indentation 22.5 degrees. Experiment has proven that the physical facts accord very closely with theory as regards suppression of harmonics by the assignment of dimensions as just described. The total harmonic content is, so far as I can determine, less than 6% or 7%, and doubtless a good deal less.

The same freedom from harmonics will be attained if the stator lands each subtend an arc of $2L/3$, instead of $L/3$, as above, while the stator indentations subtend an arc of $L/3$. The rotor lands and indentations are meanwhile kept to the dimension of $L/2$, above set forth. This proportioning for the elements of the stator may be visualized from Figure 5 by momentarily imagining that $a$ represents the indentations and $b$ the lands. Thus, two alternative constructions are possible. Whichever of the two is used, however, it will be noted that one imparts to the stator lands a longitudinal dimension of an integral number of thirds of a fundamental wave length.

The purity of wave form; i. e., the freedom from harmonics, which results from the above construction may be found to be ample for many purposes, such as for the generation of musical tones above perhaps 120 cycles per second. However, much depends upon the frequency characteristic of the remainder of the electrical equipment with which the alternator is used. If this equipment discriminates considerably in favor of high frequencies and against low ones, then it may be found necessary to further refine the design of the indentations and lands so as to also suppress those odd harmonics which were not suppressed by the above construction. Of these, the fifth and seventh harmonics have the greatest amplitudes. To reduce the fifth to zero amplitude, or nearly so, I may employ a second method simultaneously with that described just above. In this method, one may again proportion the rotor lands and indentations as above; i. e., give each an angular length of $L/2$, but one may somewhat alter the stator. This alternative form is not possible unless there are an even number of lands in the track in question. Thus it would not be available for use on track number 1, since it has but one land.

Taking stator track number 2 for an example, suppose one gives each of its two lands a wave length of $L/3$, as before, but gives to one of the indentations a length of $2L/3+L/10$ and to the other a length of $2L/3-L/10$. That is, the two lands are now one tenth of a fundamental wave length closer together on one side than they were at first, and on the other side they are one tenth of a fundamental wave length farther apart than at first. Stator track 2 will be converted by this change into the form exhibited by track 2', Figure 6. The number 102 rotor track, as said, remains as it was in Figure 5. In order to suppress the seventh harmonic, it would be necessary to reduce the length of one of the stator indentations by one fourteenth of a fundamental wave length, and expand the other by the same amount.

Generalizing the above, in order to suppress the $n$th harmonic, one reduces one indentation by the angle $L/2n$, and expands the other by the same amount. The principle underlying this second method of suppressing harmonics by the shaping and spacing apart of the lands is further explained below. Suppose one does not reduce one indentation and expand the other, as above explained. Then the $n$th harmonics contributed by the several lands will be additive, and may be great enough to be objectionable.

However, it is possible to so choose the dimensions of the lands and indentations that, as regards the $n$th harmonic, the contributions of the several lands are subtractive instead of additive. In general, this may be done for harmonics above the fourth without seriously decreasing the amplitude of the fundamental component. The method is to so choose the longitudinal dimensions of two lands and the longitudinal distance therebetween that the two generate $n$th harmonics of about the same magnitude but about 180 degrees displaced in phase relative to each other. The two $n$th harmonic components from the two lands then mutually cancel each other, or partially so.

Applying the principle to tracks having more than two lands, such as track 4, which has eight, one compresses half of the total number of indentations by the above amount and expands the other half of them by that amount. Thus, one might compress the first, third, fifth, and seventh indentations, and expand the second, fourth, sixth, and eighth. Obviously, one may start counting them at any point around the circle, since they are identical to begin with. This scheme of increasing every other indentation, and decreasing the intervening ones is possibly the best. However, an analysis of the matter will show that there are other configurations which will also serve to bring about the required cancellation of $n$th harmonics between pairs of lands.

It may be desirable to reduce both the fifth and seventh harmonics without entirely suppressing either of them. In such case, it will be found that this may be accomplished by expanding one indentation by $L/12$, compressing the next by $L/12$, and so on. This procedure would theoretically completely suppress the sixth harmonic, if it were not already absent due to its being an even harmonic. However, it will be found that the procedure also will considerably reduce both fifth and seventh, as an analysis by means of the integral calculus will show. The fifth harmonic component of voltage generated by one land is substantially equal in magnitude to that generated by the next, and their seventh harmonic components are likewise substantially equal. But all the components generated by one land are displaced from those generated by another by $L/12$ or one-twelfth of a fundamental wave length. Expressed in electrical degrees with respect to the fundamental, or in degrees of phase difference, this in one-twelfth of 360 degrees, or thirty degrees; a calculation will show that such a displacement will reduce the fundamental component of capacitance variation or of voltage by less than five per cent. However, thirty degrees with respect to the fundamental is five times thirty, or 150 degrees with respect to the fifth harmonic, and is seven times thirty, or 210 degrees with respect to the seventh harmonic. Two equal vectors 150 or 210 degrees apart will roughly cancel each other, and it will accordingly be seen that the fifth and seventh harmonics will be greatly reduced in magnitude. I have found that, at least theoretically, the total harmonic content can be made 1.50 per cent or less in this manner. Actual tests and observation with the oscilloscope and the ear have shown that the harmonics are low enough to make the alternator eminently satisfactory for use in an electronic musical instrument.

Figure 6:
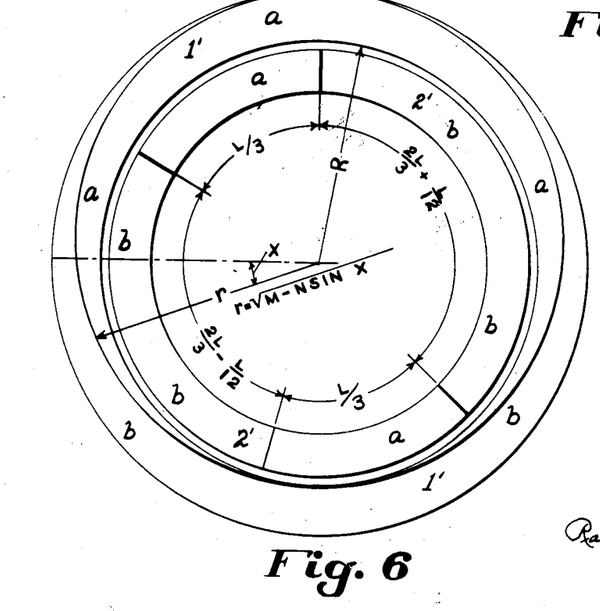
Figures 6 and 7 show alternative forms of stator tracks to meet certain special demands.

In an alternator, then, which is designed to suppress the even harmonics, the third harmonic, all multiples of the third, the fifth, and the seventh harmonic, a pair of tracks would be shaped in accordance with Figures 5 and 6. The scanning lands, those on the rotor, having a longitudinal dimension of a half wave length with respect to the fundamental, as in Figure 5, would effect the suppression of all even harmonics. They are uniformly spaced longitudinally. The scanned lands, those on the stators, are shaped as illustrated in track 2', Figure 6, and non-uniformly spaced apart at center-to-center distances of $2L/3$ plus or minus $mL/12$, where $m$ is an odd integer, and L is the wave length. The dimensions chosen for the stator lands and indentations will suppress the third harmonic and multiples of the third, and will also considerably reduce the magnitudes of the fifth and seventh harmonics. The resultant wave form will be of very low harmonic content; i. e., sinusoidal for most practical purposes. The dies necessary for the casting of such tracks will be simply made and relatively inexpensive, since the lands are bounded by radii and concentric circular arcs, and their critical surfaces are plane and may be readily machined.

In the form of tracks illustrated in Figures 4 and 5, it is obvious that the forms of rotor and stator lands may be interchanged; i. e., it would be equally feasible to place the half wave length type of lands on the stators and the third wave length type of lands on the rotor. Similarly, the forms of Figures 5 and 6 may be interchanged. In the specification, the claims, and Table A, where reference is made to the type of tracks illustrated in Figures 4 and 5, and where the wave forms to be generated are to be sinusoidal, in order to have terms for convenient use, I have rather arbitrarily used the term "scanning" to designate that one of a pair of cooperating tracks or electrodes which is designed for suppression of the even harmonics, and the term, "scanned" to designate the other of a cooperating pair.

Since a number of variants are possible in the construction of the above-described type of tone tracks, without departing from the spirit of the invention, I consider it advisable to tabulate at least some of the various combinations possible. To make the discussion applicable to other generators than the elecrostatic type, I shall refer to scanning elements or instrumentalities, rather than to scanning lands, and to scanned elements or instrumentalities, rather than to scanned lands. The term, "scanning track" is applicable to any of these types, and comprehends one or more scanning instrumentalities, together with their associated scanning intervals, which cooperate with one or more common scanned instrumentalities. A similar definition applies to the term, "scanned track." In a given tone track, two types of lands, a narrowed one and a widened one, may appear. Similarly, two types of intervals may appear. This will be seen from Table A, below. The two types of scanning instrumentalities, I designate as types II and IV respectively, and the two types of scanned instrumentalities, I designate as VI and VIII respectively. In certain cases, types II and IV may be different in longitudinal dimension, and in others, identical, as will appear. The same remark applies to types VI and VIII. Between scanning instrumentalities are scanning indentations, or, more generically designated, scanning intervals. In general, these will also be of two types, known as types I and III. On the cooperating scanned electrode, there are, or may be in general, two types of scanned intervals, types V and VII.

TABLE A

| Scanning track | | Scanned track | |
|---|---|---|---|
| ALTERNATOR TYPE ONE | | | |
| Interval type I | L/2+L/12 | Interval type V | 2L/3 |
| Instrumentality type II | L/2 | Instrumentality type VI | L/3 |
| | | Interval type VII | 2L/3 |
| Interval type III | L/2−L/12 | Instrumentality type VIII | L/33 |
| Instrumentality type IV | L/2 | | |
| ALTERNATOR TYPE TWO | | | |
| Interval I | L/2+L/12 | Interval V | L/3 |
| Instrumentality II | L/2 | Instrumentality VI | 2L/3 |
| Interval III | L/2−L/12 | Interval VII | L/3 |
| Instrumentality IV | L/2 | Instrumentality VIII | 2L/3 |
| ALTERNATOR TYPE THREE | | | |
| Interval I | L/2 | Interval V | 2L/3 |
| Instrumentality II | L/2+L/12 | Instrumentality VI | L/3 |
| Interval III | L/2 | Interval VII | 2L/3 |
| Instrumentality IV | L/2−L/12 | Instrumentality VIII | L/3 |
| ALTERNATOR TYPE FOUR | | | |
| Interval I | L/2 | Interval V | L/3 |
| Instrumentality II | L/2+L/12 | Instrumentality VI | 2L/3 |
| Interval III | L/2 | Interval VII | L/3 |
| Instrumentality IV | L/2−L/12 | Instrumentality VIII | 2L/3 |
| ALTERNATOR TYPE FIVE | | | |
| Interval I | L/2 | Interval V | 2L/3+L/12 |
| Instrumentality II | L/2 | Instrumentality VI | L/3 |
| Interval III | L/2 | Interval VII | 2L/3−L/12 |
| Instrumentality IV | L/2 | Instrumentality VIII | L/3 |
| ALTERNATOR TYPE SIX | | | |
| Interval I | L/2 | Interval V | L/3+L/12 |
| Instrumentality II | L/2 | Instrumentality VI | 2L/3 |
| Interval III | L/2 | Interval VII | L/3−L/12 |
| Instrumentality IV | L/2 | Instrumentality VIII | 2L/3 |
| ALTERNATOR TYPE SEVEN | | | |
| Interval I | L/2 | Interval V | 2L/3 |
| Instrumentality II | L/2 | Instrumentality VI | L/3+L/12 |
| Interval III | L/2 | Interval VII | 2L/3 |
| Instrumentality IV | L/2 | Instrumentality VIII | L/3−L/12 |
| ALTERNATOR TYPE EIGHT | | | |
| Interval I | L/2 | Interval V | L/3 |
| Instrumentality II | L/2 | Instrumentality VI | 2L/3+L/12 |
| Interval III | L/2 | Interval VII | L/3 |
| Instrumentality IV | L/2 | Instrumentality VIII | 2L/3−L/12 |

There is a general principle for suppression of the $n$th harmonic which lies at the basis of all eight types of pairs of coacting tracks in Table A. One longitudinally spaces apart the instrumentalities of one track, or group, at uniform intervals, and makes the instrumentalities of that track all alike. One further chooses the longitudinal dimensions of the instrumentalities and intervals of the other track so that, for each instrumentality of that other group, there is another which generates an $n$th harmonic substantially equal in magnitude and substantially 180 electrical degrees out of phase with the $n$th harmonic generated by the first-mentioned instrumentality of the second group. The result of this choice of dimensions is that the $n$th harmonics generated by the two instrumentalities substantially cancel each other.

The above choice of the words, "instrumentality" and "interval" instead of the more specific terms, "land" and "indentation" respectively has been made advisedly for reasons which will fully appear hereinafter. It will suffice at this point to say that the contours of intervals and instrumentalities recited is applicable to other types of generator than the electrostatic alternator.

Since, as stated above, the above method of suppressing the fifth and seventh harmonics is not applicable to track I, I may in that instance use an alternative form of stator track I', Figure 6. This form is of value particularly when a very close approximation to a sinusoidal wave form of capacitance variation is desired. At "a" I show the scanned instrumentality and at "b", the depressed portion of the track. The inside edge of the scanned instrumentality may follow the circumference of a circle concentric with the axis of rotation of the rotor. Let the radius of this circle be R. The outer edge is given a contour such that its radius, $r$, at any angular position, $x$, is given by the equation, $$r = \sqrt{M - N \sin x} \qquad \text{Equation 1}$$

where M is a positive constant, and N is a positive constant equal to or less than $M - R^2$. The restriction on relative magnitudes is obviously imposed in order to avoid a non-realizable construction.

It is easily seen that the maximum radius assumed by the outer edge is the square root of $M+N$, and that the minimum is the square root of $M-N$. The outer and inner edges of the scanning lands on the rotor of such an electrostatic alternator must be respectively enough greater than this maximum and smaller than this minimum so that fringing flux does not cause a defect in scanning of the stator. In other words, the rotor land must, at all times during rotation, somewhat overhang the stator land, both at inside and outside.

It is to be noted that the stator instrumentality extends entirely around the circle; i. e., it subtends an entire wave length. With this type of scanned instrumentality, it is immaterial whether the scanning instrumentality subtends a half wave length, or not. It may subtend any angle, although the variation of capacitance will be a maximum when it subtends a half wave length.

Figure 7:
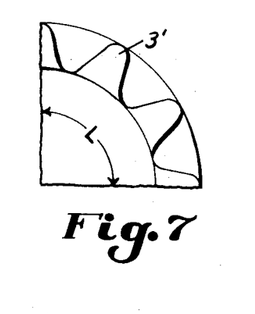

Obviously, an alternative form of stator track may be constructed wherein the outer edge of the stator may be made the circumference of a circle concentric with the axis of rotation, and the inner edge may be given a contour such that the capacitance variations are sinusoidal. This is shown in Figure 7 if, temporarily, we let "b" represents the scanned instrumentality, instead of "a". The radius, $r$, of the inner edge of the scanned instrumentality at any angular position is also given by the Equation 1 above. Again, the maximum radius which the inner edge can assume is the square root of $M+N$, and the minimum value is the square root of $M-N$. Naturally, the maximum may not be greater than $R_1$, the radius of the outer edge of the instrumentality, if the latter is to be complete around the entire wave length, and not "pinched out" in certain regions. Hence, in this case, N must be not greater than $R_1^2-M$. Also, the minimum may not be so small that the land covers more width, measured radially, than can be assigned to it for structural or mechanical reasons, and the values of M and N are chosen so that it will fit within this space.

The design enunciated just above, wherein the stator instrumentality has an outer or inner edge of specially curved contour, is also applicable to tracks having more than one wave length, say $m$ wave lengths, in the 360 mechanical degrees. Thus one arrives at Equation 2, generalized over Equation 1:

$$r = \sqrt{M - N \sin mx} \qquad \text{Equation 2}$$

It is seen that Equation 1 is merely a special case of Equation 2, covering the case where $m$ is unity.

Such a scanned instrumentality may extend entirely around the 360 degrees, covering $m$ wave lengths, though it need not. It may cover any integral number of wave lengths less than $m$, as well. If it extends entirely around the circle, it will have $m$ equal maxima and $m$ equal minima, and there will also be $m$ identical scanning instrumentalities on its coacting rotor track, each such instrumentality preferably having a longitudinal or tangential dimension of L/2. For musical instrument purposes, I have found it desirable, though not necessary, to design on this principle, rather than as in Figures 4 and 5, those tracks for which $m$ is respectively 1 and 2. Tracks numbers 3 to 6, and 103 to 106, I prefer to design as illustrated in Figures 5 and 6, or analogously thereto; i. e., for the suppression of fifth and seventh harmonics. Track 7, I prefer to design with rotor instrumentalities covering one-half wave length, uniformly spaced, and with stator instrumentalities covering one-third wave length, and also uniformly spaced; that is, analogously to Figures 4 and 5, for suppression of second and third harmonics and integral multiples thereof. This is entirely satisfactory, since the harmonics will be of rather high audio frequency, and therefore discriminated against by the ear, and perhaps by the amplifier and loudspeaker likely to be connected with the alternator. In the case of track 8, one may afford to be even less critical. In fact, fringing is likely to be appreciable unavoidably, unless guard electrodes are used, as taught in my earlier patent, above referred to. It is sufficient to give both rotor and stator instrumentalities a width of one-half wave length. Of course, the above design details are illustrative of a preferred form only, and my invention covers the design of any of the tracks in accordance with any of the design principles enunciated in this specification, and set forth in the appended claims.

It has been stated above that, with the scanning and scanned instrumentalities disposed on discs as hereinabove set forth, a harmonic will be absent from the wave form of capacitance variation provided each scanning instrumentality has radial sides and subtends a full wave length for that harmonic. Thus, if one wished to build a generator of periodic currents which was mechanically similar to that above described, but which was possessed of a desired or prescribed complex wave form, or which had a prescribed upper partial content in respect to its variation of capacitance or effective area instead of the sinusoidal ones which characterize the above species of generator, then it would be necessary for one to first decide upon the harmonic content he wished to attain, and then to assign to the scanning instrumentality a dimension, in the direction of its motion relative to the scanned instrumentality, which was not a full wave length to any of the desired harmonics. One or more of the desired harmonics would otherwise naturally be missing from the wave form of capacitance. The scanning instrumentality would be bounded by radii and concentric or coaxial circular segments, as above described in connection with Figure 5.

Having thus determined the angle to be subtended by the scanning instrumentality, one may then proceed to a design of the contour to be given the scanned instrumentality. Like that of Figure 7, the present scanned instrumentality may have a circular inner edge of radius R, coaxial with the axis of rotation, and lying in a plane perpendicular thereto. The outer edge of the instrumentality is to be shaped in accordance with the following design principles.

Let A be the effective area of either instrumentality, which area varies from instant to instant in accordance with a prescribed periodic wave form. In accordance with Fourier's Theorem, this area can be expressed as:

$$A = A_0 + A_1 \cos(mx + a_1) + A_2 \cos(2mx + a_2) + \ldots + A_k \cos(kmx + a_k)$$

where $m$ is the number of complete fundamental wave lengths in the entire 360 degrees of the given track, $A_0$ is the unvarying component of prescribed area (chosen sufficiently large so that A at no time becomes negative, $A_1, A_2, \ldots A_k$ are the amplitude constants appropriate to the wave form or harmonic content prescribed, $x$ is the angle between some reference radius on the scanning track and one on the scanned track, and $a_1, a_2, \ldots a_k$ are the phase angles of the harmonics in the area function. If one desires merely a harmonic content or upper partial content in accordance with one prescribed, then the phase angles are of no importance, and may be assigned any convenient or arbitrary values. In musical instrument applications, it is not usual to pay any attention to phase angles between partials, since it is well known that the ear is relatively insensitive to these. See "The Science of Musical Sounds," by D. C. Miller (MacMillan, publishers), pages 166, 196, 62, and 63. The page references are to the edition of 1926. If the scanning instrumentality has a longitudinal dimension, D, in the direction of relative motion between scanning and scanned instrumentalities, then it can be proved that $r$, the radius of the outer edge of a scanned instrumentality at any angle, $y$, from the reference radius on said scanned instrumentality should be:

$$r=\sqrt{B_0+B_1\cos(my+b_1)+B_2\cos(2my+b_2)+\ldots+B_k\cos(kmy+b_k)}$$

where $$B_0=2A_0+R^2D$$

$$B_1=\frac{mA_1}{\sin\frac{mD}{2}}$$

$$B_2=\frac{2mA_2}{\sin\frac{2mD}{2}}\ldots$$

$$B_k=\frac{kmA_k}{\sin\frac{kmD}{2}}$$

$$b_1=2a_1+mD$$

$$b_2=2(2a_2+mD)\ldots$$

$$b_k=k(2a_k+mD)$$

From the above design formulas, the outline of the scanned instrumentalities may be laid out by methods known to the mathematician. Then the curved edges of the scanning instrumentalities are to be so determined by the constructor that each of them extends beyond, or "overhangs" the scanned one, in accordance with the dictum hereinbefore mentioned. Without this, a part or parts of the scanned track would fail to be scanned. If the phase angles between partials in the area function are not critical, then the constructor may assign any desired or convenient values to the phase angles, $b_1, b_2, \ldots b_k$, instead of the values shown in the above equations.

As an example of the method, suppose one wishes the area to vary in accordance with the following prescribed wave form data. $R=10$ cm., $A_0=5$ sq. cm., $A_1=A_3=2$ sq. cm., and all the other A's are zero. All $a$'s are 0, and $m=4$. Here, D may be $\pi/4$ radians, since this is not a complete wave length, either for the fundamental or the third harmonic, which are the only components present. The scanning track may then consist of four elements, and look like track 103, Figure 5.

We calculate that $B_0=44.25$, $B_1=4$, $B_3=-12$, $b=\pi$, $b=_9=^3\pi$. All other B's are zero. Thus, $$r=\sqrt{88.25-8\cos 4y+24\cos 12y}$$

The quantity under the radical may be plotted in terms of $y$, and then $r$ as a function of $y$ may be found by well known methods of computation, and plotted. From the plot of $r$, its maximum and minimum values are determined, and the outline of the scanning element is so chosen as to extend beyond the scanned one, both inwardly (toward the center) and outwardly at all times during revolution.

Figure 7, at 3', shows a portion of the track shaped substantially as above designed. Except in outline, part 3' is similar to part 3 of Figure 4, and may be similarly positioned relative to part 103 of Figure 5, with a narrow air gap between. It is to be understood that track 3' must subtend an integral number of fundamental wave lengths; one, two, three, or all four. As illustrated, it subtends one. If some other track were being designed, wherein, for example, $m=8$, then the track's pattern would have to subtend some integral number of fundamental wave lengths, from one to eight, inclusive.

It is essential to the present method of shaping electrodes and other instrumentalities for complex wave forms that the scanned instrumentality shall subtend an integral number of fundamental wave lengths. Essential also is the provision of a scanning instrumentality whose dimension, in the direction of its motion relative to said scanned element, differs substantially from a full wave length at any harmonic which is to appear in the wave form produced. This particular assignment of dimension to the scanning element I regard as novel, and wish to secure by Letters Patent.

I had formerly regarded it as necessary that the scanning instrumentality for the production of complex wave forms or tones should not be greater in longitudinal dimension than about half of the shortest wave length desired to be reproduced in the voltage. See, for example, my Patent No. 2,055,719, Figure 12b, and the description thereof. However, I have since discovered that, if the further limitations hereinabove explained are imposed on the scanning and scanned instrumentalities, then the former limitation may be dispensed with. Thus, the shaping herein taught is distinct from that of my earlier patent, and certain of the claims are drafted so as to reflect this distinction. The advantage of the present design and shaping is that the magnitude of the generated voltage may be greater than that from my earlier device without a substantially larger mechanism.

Experience with ordinary gears used to drive alternators such as are used to generate musical tones has proven that the mechanical shocks set up at the gear teeth by backlash and perhaps otherwise are very detrimental to the purity of the tones. This is probably due to the microphonic vibrations set up in the rotor of the alternator. It is also evident that non-uniformities in gear-tooth spacing may also affect the purity, as has been experienced in certain phonograph drive mechanisms.

Figure 8:
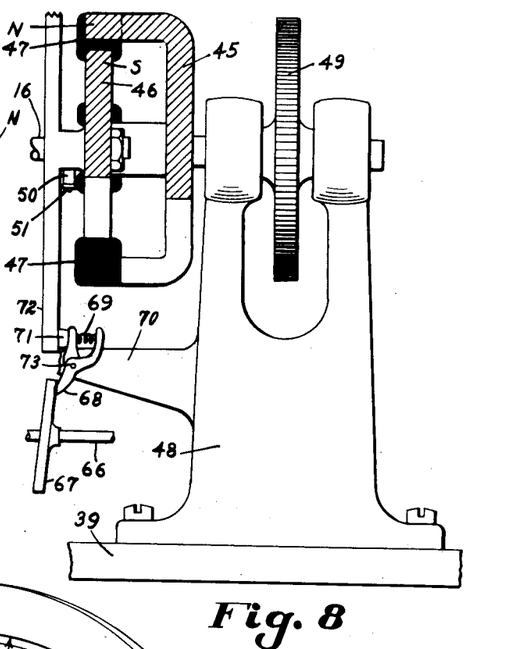
Figure 8 shows partly in section and partly in side elevation, a magnetic and geared means for actuating an alternator.

In Figure 8, I illustrate an alternative driving means for an electrostatic or other alternator when, as here, its rotor must be free from mechanical shocks generated in said driving means. Reference numbers in this figure which also appear in other figures refer to the same parts as in those figures. At the left side of Figure 8, a portion is illustrated in section, the section planes being those marked AA in Figure 9. At 49, I show an ordinary metallic driven gear, journaled in a bearing hanger 48, and assumed to be driven from a similar driving gear on a countershaft, as is common in mechanical drives. So common are these drive features that I have not considered it necessary to illustrate the driving gear and countershaft.

Figure 9:
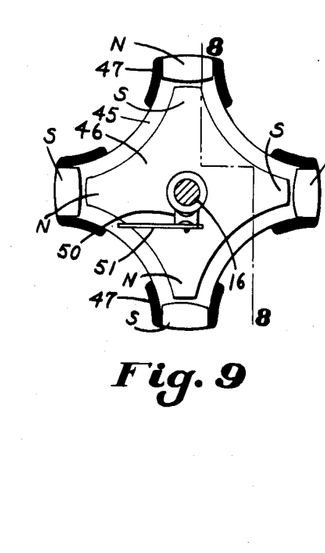
Figure 9 is a front elevation of a part of the means of Figure 8.

It is necessary, with ordinary gears, to provide, in the transmission intermediate the driven gear and the rotor, a shock absorber of some sort. In Figures 8 and 9, I show such a mechanism at 45, 46, and 47. Parts 45 and 46 are cruciform magnets of Alnico, poled as marked. Due to the magnetic attraction between the adjacent poles of the two, any rotation of magnet 45 will tend to produce a similar rotation in magnet 46. Due to the well-known nature of the magnetic forces, and the inertia of the alternator rotor, whose shaft appears at 16 in Figures 8 and 9, vibration in the gearing is not effectually transmitted to the alternator rotor. It is possible, by properly proportioning the magnetic moments and rotor moment of inertia, to give to the rotor and parts rigidly attached thereto, a period of considerably longer than 1/20 second, and this will tend to permit uniform rotational velocity in shaft 16, even when the velocity in gear 49 is rather non-uniform.

In order that the rotor may follow the gear when it first starts in rotation, I have provided rubber blocks 47, vulcanized or otherwise attached to the magnet 45. These engage the sides of the arms of magnet 46 at the outset of rotation. However, when full and fairly uniform speed has been established, the poles of the magnet 45 assume control over those of 46, and the poles of the latter "float" between their rubber blocks without touching the latter at all. The drive is thus similar in behavior and function to a very flexible mechanical coupling without the mechanical attribute of flexibility being present.

In case gear friction sets up troublesome static potentials, the hanger 48 is preferably grounded, to drain off via the journals any electrostatic charges. It will be noticed that parts 45 and 49 are insulated from the rotor and its shaft at all times. The shield 21, shown in Figure 1, may be omitted when the drive mechanism of Figures 8 and 9 is employed, and brush 50 and brush holder 51 may be mounted as shown in the latter two figures. Their functions are the same as those of their counterparts 27 and 28 respectively, in Figure 1, and they may be accordingly connected directly to ground. Likewise, the friction gear 34 and its associated parts 52, 53, 60, and 61 are of course omitted as unnecessary. Otherwise the alternator driven by the magnetic means may be the same as that of Figure 1.

In an electronic musical instrument, it is very valuable to provide the possibility of slight variations in pitch, to break up standing waves in the sound heard from the instrument. In my Patent No. 2,055,719, I have shown a variable mechanical impedance for accomplishing this by varying the rotational speed of the alternator and its prime mover. The present application shows an improvement upon this, in the fact that the prime mover speed need not vary in response to the mechanism.

At 66 I show a cam, or swash plate, rotated slowly by shaft 67. The shaft may be rotated by any convenient means, as an electric motor of adjustable speed, for example. The cam rocks rocker arm 68 slightly about its fulcrum 73, which is mounted on the bearing hanger 48. Also mounted on the hanger is the brake arm 70. Although the two arms are both pivoted on the same center 73, they are not rigidly attached together. Through spring 69, pressure is communicated from the rocker arm to brake arm 70, and thereby to the brake shoe 71. The latter may be of leather or other slightly yielding material, and bears against brake drum 72. The spring 69 serves both to hold the brake shoe always in contact with the drum, and the rocker arm always against the cam.

If the cam is shaped substantially as shown in Figure 8, and the shaft 67 rotates $w$ times per second, where $w$ is a number preferably between four and ten, the variations in braking moment occasioned by the cam will cause periodic variations in the speed of rotation of the brake shoe and the alternator rotor attached thereto. If the variation is of the necessary amount, the result will be a vibrato effect in the tones emitted by the musical instrument in which the alternator is employed.

A more effective vibrato will result if one so chooses the moment of inertia of the alternator rotor, and the strength of magnetic pull of the poles of magnets 45 and 46 that the natural frequency of the rotor is $w$ cycles per second. If this be done, it will be found that only slight variations in braking force will be necessary to bring about entirely adequate speed variations. A great saving in power in the prime mover is thus possible.

The cam may also be irregularly shaped and rotated, say, once in three seconds, in which case the ear will be almost unconscious of any periodicity in braking action, while the relief from standing waves will still be present.

The braking mechanism is omitted from Figure 9, since it would only tend to confuse the drawing, without greatly adding to the clarity of the disclosure.

In the foregoing, the use of the words "instrumentality" and "interval" instead of the more specific terms, "land" and "indentation" respectively has been made advisedly, because the shapes and comparative dimensions here set forth are applicable to other types of alternating current producers than the electrostatic alternator. For example, the instrumentality might be a transparent area in a disc interposed in a light beam in a photoelectric tone generator, and the interval might be a space opaque to light which lay between two transparent spaces. Or the instrumentalities might be poles of a dynamoelectric alternator, and the intervals the spaces between the poles.

In the claims, where I refer to an alternator or a generator, except where the meaning is limited by further phraseology, I mean to refer to any means for producing or generating periodic electric currents and voltages by mechanical motion of one part of said alternator or generator relative to another part thereof. Thus, the term may include photoelectric, dynamoelectric, electrostatic, variable resistance, chopper, or other means, unless otherwise limited. The relative motion of the parts of the alternator or generator may be rotation, as in Figure 1 of this application or Figure 11b of my Patent No. 2,055,719; or they may move in translation, as in Figures 10 and 10a of said patent; or they may move reciprocally, as in Figure 12 of said patent. The leakage trap, for example, is applicable to any of the three types.

Where I use the letter "$n$" or the letters "$n$th," it is to be understood that such usage is in accordance with that common in mathematics, and that "$n$" designates any suitable positive integer.

It is, of course, well known to use dynamoelectric or photoelectric means for the production of periodic currents and voltages. The analogous relationship of the scanning operation in these two instances to that in the electrostatic alternator is obvious enough in a general way to require no comment, except to note that the possibility of appreciable fringing magnetic or electrostatic lines of force about the poles or electrodes, and of departure from equipotential conditions at magnet poles must not be ignored. Also, care must be taken that the light passing through the transparent areas in the photoelectric device is reasonably uniform in intensity at all parts of those areas. With these and perhaps other equally obvious precautions, all the foregoing teaching as to shaping, even where it refers to the electrostatic alternator and its lands and indentations, can be carried over directly to other types of generator, such as the two types above specified.

Although shaped instrumentalties are well known in the art, I believe that I am the first to teach the proper shaping of scanning and scanned instrumentalities for use on cooperating discs for the instance where the scanned instrumentality subtends a full wave length (as in track 3', Figure 5), and where the desired or prescribed wave form is non-sinusoidal. I also believe myself to be the first to teach the particular dimensions and shaping hereinabove enunciated for the scanning and scanned instrumentalities and intervals in any device whatever to give sinusoidal or prescribed complex wave forms. The generic nature of the invention is reflected in the use of "track," "instrumentality," and "interval," instead of the respective terms "electrode," "land," and "indentation."

Other variations and modifications of the invention may be made by those skilled in the art, and hence I desire to limit my invention only to the extent determined by the scope of the claims hereto appended.

For example, it will be seen that the above principles of electrode design and of the design and shaping of scanning and scanned instrumentalities are applicable to alternating current generators wherein the tracks are disposed on the surfaces of cylinders, or on planes, and wherein the relative motion is pure translation. In the case of cylinders, the wave length will have the same definition as above given for disc surfaces, and will be measured in degrees or radians. The same is true of the center-to-center distances mentioned in the claims.

In the case of scanning and scanned instrumentalities which move relatively in translation, as do those of Figures 10 and 10a in my Patent No. 2,055,719, the terms "wave length" and "center-to-center distance" will have to be measured, not in degrees or radians, but in units of length, as inches or centimeters. This is because the curved surfaces of cylinders, or the arcuate ones of the faces of discs are adapted to polar coordinates, whereas the instrumentalities moving in pure translation adapt themselves to Cartesian coordinates. In the case of electrodes or instrumentalities in translation, the wave length is the linear distance through which the scanning instrumentality must travel to generate one cycle of voltage of the fundamental frequency. Both wave length and center-to-center distance are to be measured in the longitudinal direction; i. e., along the direction of relative motion, and on a line parallel to the line of such motion.

As a second example of a modification or species which is comprehended by the spirit of my invention, the instrumentality I' of Figure 6, might have both its inner and outer edges shaped in accordance with Equation 2.

I claim:

1. In an apparatus for producing a periodic voltage, and comprising a scanning instrumentality, a scanned instrumentality, and means for maintaining relative motion therebetween, the method of suppressing the second and third harmonics and integral multiples thereof in said voltage, which consists in imparting to said scanning instrumentality an effective longitudinal dimension equal to substantially an integral number of halves of the fundamental wave length, and to said scanned instrumentality an effective longitudinal dimension equal to substantially an integral number of thirds of the fundamental wave length.

2. In an apparatus for producing a periodic voltage, and comprising a scanning instrumentality and a scanned instrumentality, the method of suppressing the $n$th harmonic in said voltage which consists in imparting to one of said instrumentalities a longitudinal dimension substantially equal to an integral number of $n$ths of a fundamental wave length.

3. An apparatus for producing a periodic voltage, comprising a scanning instrumentality, a scanned instrumentality, and means for maintaining relative motion therebetween; one of said instrumentalities having a longitudinal dimension substantially equal to an integral number of $n$ths of a fundamental wave length, whereby the $n$th harmonic is suppressed in said voltage.

4. In an apparatus for producing a periodic voltage, and comprising an even number of voltage-generating instrumentalities constituting a first group, an even number of voltage-generating instrumentalities constituting a second group, and means for maintaining relative motion between said two groups, the method of suppressing a given harmonic in said voltage which consists in longitudinally spacing apart the instrumentalities of said first group at substantially uniform center-to-center distances, and which further consists in making the longitudinal dimensions of the instrumentalities of said second group and of the intervals therebetween such that the component of said given harmonic which is generated by each instrumentality of said second group is substantially equal in magnitude to, and 180 electrical degrees out of phase with, the component of the same harmonic generated by another instrumentality of said second group.

5. An apparatus for producing a periodic voltage of low harmonic content, comprising a scanning instrumentality, a scanned instrumentality, and means for maintaining relative motion therebetween, said scanning instrumentality having a longitudinal dimension of substantially one half of the fundamental wave length, whereby all even harmonics in said voltage are suppressed, said scanned instrumentality having a longitudinal dimension of substantially an integral number of thirds of the fundamental wave length, whereby the third harmonic and harmonic multiples thereof in said voltage are suppressed.

6. In an apparatus for producing a periodic voltage from which a given harmonic is substantially absent, an even number of voltage-generating instrumentalities constituting a first group, an even number of voltage-generating instrumentalities constituting a second group, and means for maintaining relative motion between said two groups, the instrumentalities of said first group being longitudinally spaced at substantially uniform center-to-center distances; the instrumentalities of said second group and the intervals therebetween having longitudinal dimensions such that the component of said given harmonic which is generated by each instrumentality of said second group is substantially equal in magnitude to, and substantially 180 electrical degrees out of phase with, the component of the same harmonic generated by another instrumentality of said second group.

7. An apparatus for producing a varying voltage having low fifth and seventh harmonics, comprising two groups of voltage-generating instrumentalities, and means for maintaining relative motion between these two groups, the instrumentalities of said first group being longitudinally spaced at substantially uniform center-to-center distances, the instrumentalities of said second group and the intervals therebetween having longitudinal dimensions such that the component of said fifth harmonic which is generated by each instrumentality of said second group is substantially 150 electrical degrees out of phase with the component of the fifth harmonic generated by another instrumentality of said second group, said dimensions also being such that the component of said seventh harmonic which is generated by each instrumentality of said second group is substantially equal in magnitude to, and substantially 210 electrical degrees out of phase with, the component of the seventh harmonic generated by another instrumentality of said second group.

8. An apparatus for producing a complex periodic wave form of voltage, comprising a scanning instrumentality, a scanned instrumentality, and mechanical means for maintaining relative motion therebetween, said scanning instrumentality having an effective longitudinal dimension which differs substantially from the wave length of each of the partial components which it is desired shall appear in said wave form, and which dimension is greater than substantially half of the shortest wave length possessed by any of said components, said scanned instrumentality having a longitudinal dimension subtending an integral number of fundamental wave lengths.

9. An apparatus for producing a sinusoidal wave form of voltage, comprising a scanning instrumentality, a scanned instrumentality, and means for maintaining relative rotation between said instrumentalities, said instrumentalities lying substantially in parallel planes and so mounted as to rotate relatively in coaxial relationship, said scanned instrumentality subtending an angle of an integral number of fundamental wave lengths and having at least one contour shaped substantially as specified in the equation:

$$r = \sqrt{M - N \sin mx}$$

wherein $x$ represents the angle between any radius and a fixed reference radius, said radii lying in the plane of said scanned instrumentality and passing through the axis of said rotation, $M$ and $N$ represent positive real constants reckoned in centimeters squared, $m$ represents a positive integer, and $r$ represents the distance, reckoned in centimeters, along said first radius, from said axis to said contour.

10. An electrostatic alternator comprising a rotor, a pair of coaxial bearings supporting said rotor, and elastic preloading members for removing the play or lost motion from between said bearings and said rotor, whereby microphonic variations of capacitance in said alternator are reduced.

11. In an electrostatic alternator, a pair of electrodes active to originate varying voltage translatable into sound, and a trap electrode adapted to collect and carry away leakage currents which would otherwise flow from either electrode of said pair to the other.

12. An apparatus for originating varying electric currents translatable into sound, comprising a tone current generator having relatively rotating parts, a prime mover for actuating said generator, and a magnetic linkage adapted to transmit mechanical power from said prime mover to said generator, the magnetic moments in said linkage and the moment of inertia of the driven parts of said generator having magnitudes such as to impart to said driven parts a natural period longer than one-twentieth of a second.

13. In a rotary means for producing varying electric currents, a driving shaft, a driven shaft substantially parallel to said driving shaft, a rotary source of alternating electromotive force mechanically actuated by said driven shaft, a pair of friction gears one of which is provided with a yielding rim, whereby the rotation of said first shaft is enabled to produce rotation of said second shaft, and means for adjusting the distance between said shafts and for accordingly adjusting the compression produced in said rim, whereby the speed ratio of said shafts and the frequency of said electromotive force are adjusted.

14. In an electrostatic alternator for generating a varying voltage and having a pair of conductive electrodes, the method of reducing the magnitude of varying residual voltage originating in said alternator which consists in coating selected portions of said electrodes with a chemically inert, electrically conductive material.

15. An electrostatic alternator comprising a stator electrode, a rotor electrode, and a pickup electrode whose capacitance to said rotor electrode remains substantially constant during the rotation of said rotor electrode.

16. The combination of a rotatable driving member, a rotatable driven member, a generator of varying electromotive force actuated by said driven member, yielding means adapted to transmit torque from one of said members to the other and to permit variations in the ratio between the instantaneous rotational speeds of said members, and variable mechanical impedance means adapted to absorb from said driven member energy which varies at a subaudible frequency below ten cycles per second, whereby said ratio and the frequency of said electromotive force are varied at the same subaudible frequency.

17. In an electrostatic generator of varying electric potential having a pair of relatively movable conductive electrodes and means for causing relative movement of said electrodes, means for reducing the magnitude of varying residual voltage originating in said generator, said means consisting of a chemically inert electrically conductive coating on portions of said electrodes which coact electrostatically with each other.

RAYMOND C. FISHER.